US011951595B1

(12) United States Patent
Doty

(10) Patent No.: US 11,951,595 B1
(45) Date of Patent: Apr. 9, 2024

(54) SYSTEM FOR INSTALLING AND REMOVING A DRY PENDANT SPRINKLER

(71) Applicant: Thomas W. Doty, Oak Island, NC (US)

(72) Inventor: Thomas W. Doty, Oak Island, NC (US)

( * ) Notice: Subject to any disclaimer, the term of this patent is extended or adjusted under 35 U.S.C. 154(b) by 0 days.

(21) Appl. No.: 18/532,306

(22) Filed: Dec. 7, 2023

(51) Int. Cl.
*B25B 13/50* (2006.01)
*A62C 35/68* (2006.01)
*B25B 23/00* (2006.01)

(52) U.S. Cl.
CPC .............. *B25B 13/50* (2013.01); *A62C 35/68* (2013.01); *B25B 23/0035* (2013.01)

(58) Field of Classification Search
CPC ...... B25B 13/50; B25B 23/0035; A62C 35/68
See application file for complete search history.

(56) References Cited

U.S. PATENT DOCUMENTS 7,055,614 B1 * 6/2006 Ide ......................... A62C 37/14 169/37
7,185,567 B2 * 3/2007 Ide .......................... B25B 13/50 81/124.2
7,185,576 B2 * 3/2007 Heitzer .................. B62D 5/083 91/375 A
8,997,323 B1 * 4/2015 Sanders ................ B66F 7/0633 29/270
9,415,470 B2 * 8/2016 Curry ...................... B05B 15/74
9,457,212 B2 * 10/2016 Williams ............... A62C 35/68
11,325,227 B2 * 5/2022 Aviguetero, Jr. ....... B05B 15/60
2015/0202748 A1 * 7/2015 Trudeau ................ B25B 13/481 81/436
2021/0078143 A1 * 3/2021 Aviguetero, Jr. ... B25B 13/5091
2023/0050624 A1 * 2/2023 Pipe ....................... A62C 37/09

* cited by examiner

*Primary Examiner* — Bayan Salone
(74) *Attorney, Agent, or Firm* — Ashley D. Johnson; Dogwood Patent and Trademark Law

(57) ABSTRACT

The invention is a system used to effectively install and remove dry sprinkler pendent heads. The system includes a barrel that cooperates with an associated fitting configured about the exterior of the outer casing tube of a pendent sprinkler. Specifically, the barrel includes a slot channel and extension sized and shaped to house one or more fitting teeth to releasably join the fitting and the barrel. Once joined, the barrel can be rotated to thereby install or remove an attached pendent sprinkler.

20 Claims, 11 Drawing Sheets

SYSTEM FOR INSTALLING AND REMOVING A DRY PENDANT SPRINKLER

TECHNICAL FIELD

The presently disclosed subject matter is directed to a system for easily and efficiently installing and removing a dry pendant sprinkler. The presently disclosed subject matter further includes methods of using the system.

BACKGROUND

Fire suppression systems are used extensively in office buildings, warehouses, factories, hotels, homes, and other structures to provide reliable and effective ways to suppress the spread of fire. The suppression systems typically include a piping network extending throughout the building. The piping network is connected to a source of fire suppressing fluid (e.g., water) and is in fluid communication with sprinkler heads distributed throughout the building that will discharge the fire suppressing fluid in the event of a fire. In these systems, dry pendent sprinklers may hang from above-ceiling pipes and distribute water in a domed or conical pattern using a convex deflector.

Each sprinkler head has a discharge orifice with a valve that is biased into a normally open position held in a closed position against the biasing force by a frangible glass bulb housing a heat-sensitive fluid. The bulb can be elongated in design such that the biasing force places it under compression along the long axis. The bulb is very strong in compression along its long axis but easily breaks when force is applied transversely to the axis. During a fire, the heat-sensitive fluid expands within the bulb. When a predetermined temperature is reached, the heat-sensitive fluid applies hydraulic pressure outwardly against the bulb normal to the long axis, causing the bulb to shatter. The valve then opens and discharges the fire suppressing fluid.

Traditional methods of installing and removing dry sprinkler heads are both tedious and time consuming. For example, when a sprinkler housing is removed for replacement, repositioning, and/or repair, the user must dig around the sprinkler housing to gain access to the connection between the housing and the piping system. Such a process can require vast amounts of time and requires a significant effort, even for a single sprinkler. In addition, the area surrounding the sprinkler is often damaged, which leads to costly repairs. It would therefore be beneficial to provide a system that overcomes the shortcomings of the prior art to effectively install and remove a dry pendent sprinkler.

SUMMARY

The presently disclosed subject matter is directed to a pendent sprinkler installation and removal system. Particularly, the system includes a fitting defined by an interior passageway with an inner diameter that is complementary to the outer diameter of a pendent sprinkler. The fitting also includes one or more teeth that extend outwardly from an outer edge of the fitting. The system also includes a barrel comprising a closed first end defined by an aperture, and an open opposed second end. A barrel sidewall is positioned between the first and second ends. The sidewall comprises at least one slot adjacent to the first end, the slot comprising a channel adjacent to the first end and an extension positioned in communication with the channel. Each fitting tooth is configured for releasable insertion into the channel and extension of a corresponding slot.

In some embodiments, the pendent sprinkler is a dry pendent sprinkler. A "pendent sprinkler" is any type of fire sprinkler head or system designed to be installed below the piping in a sprinkler system, typically mounted on the ceiling in an inverted orientation with the sprinkler head visible. A "dry pendent sprinkler" refers to a pendent sprinkler that extends into an unheated area form a wet pipe system, avoiding pipe freeze-ups and system impairments (with associated piping located outside/above the sprinkler enclosure).

In some embodiments, the aperture is configured for inserting a drive of a socket wrench positioning a user for selectively turning the socket wrench for removing and installing the sprinkler head. The term "socket wrench" refers to a wrench with a female socket or recess that grips the male head of a fastener or fitting to apply torque to turn it.

In some embodiments, the fitting includes 1-2, 1-4, or 1-10 teeth.

In some embodiments, the teeth are evenly spaced about the perimeter of the fitting.

In some embodiments, the fitting has a length, width, or both of about 0.5-5 or 0.5-10 inches (e.g., at least/no more than about 0.5, 1, 1.5, 2, 2.5, 3, 3.5, 4, 4.5, 5, 5.5, 6, 6.5, 7, 7.5, 8, 8.5, 9, 9.5, or 10 inches).

In some embodiments, each tooth has a length, width, and thickness of about 0.1-1 inch or about 0.1-5 inches (e.g., at least/no more than about 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, or 5 inches).

In some embodiments, the barrel comprises a length of about 5-50 inches (e.g., at least/no more than about 5, 10, 15, 20, 25, 30, 35, 40, 45, or 50 inches) and a width of about 2-25 inches (e.g., at least/no more than about 2, 5, 10, 15, 20, 25 inches).

In some embodiments, the barrel slot is configured in a T shape.

In some embodiments, the barrel slot channel has a length and height of about 0.1-5 inches (e.g., at least/no more than about a 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, or 5 inches).

In some embodiments, the barrel slot extension has a length of about 0.2-5 inches (e.g., at least/no more than about 0.2, 0.5, 1, 1.25, 1.5, 1.75, 2, 2.25, 2.5, 2.75, 3, 3.25, 3.5, 3.75, 4, 4.25, 4.5, 4.75, or 5 inches) and a height of about 0.1-5 inches (e.g., at least/no more than about 0.1, 0.5, 1, 1.25, 1.5, 1.75, 2, 2.25, 2.5, 2.75, 3, 3.25, 3.5, 3.75, 4, 4.25, 4.5, 4.75, or 5 inches).

In some embodiments, the presently disclosed subject matter is directed to a method of installing or removing a pendent sprinkler. Specifically, the method comprises positioning a fitting of the disclosed system about the exterior of a pendent sprinkler. The method includes inserting the open second end of the barrel over a portion of the pendent sprinkler such that each fitting tooth travels along the slot channel. The method includes rotating the barrel such that each tooth is positioned with a corresponding slot extension, thereby releasably joining the barrel to the fitting. The method includes inserting a tool into the aperture of the first end of the barrel to rotate the barrel, thereby installing or removing the pendent sprinkler.

In some embodiments, a socket wrench drive is inserted into the aperture of the first end of the barrel to rotate the barrel.

DETAILED DESCRIPTION

The previous summary and the following detailed descriptions are to be read in view of the drawings, which illustrate some (but not all) embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−0.1-20% from the specified amount, as such variations are appropriate in the disclosed packages and methods.

Figure 1A:
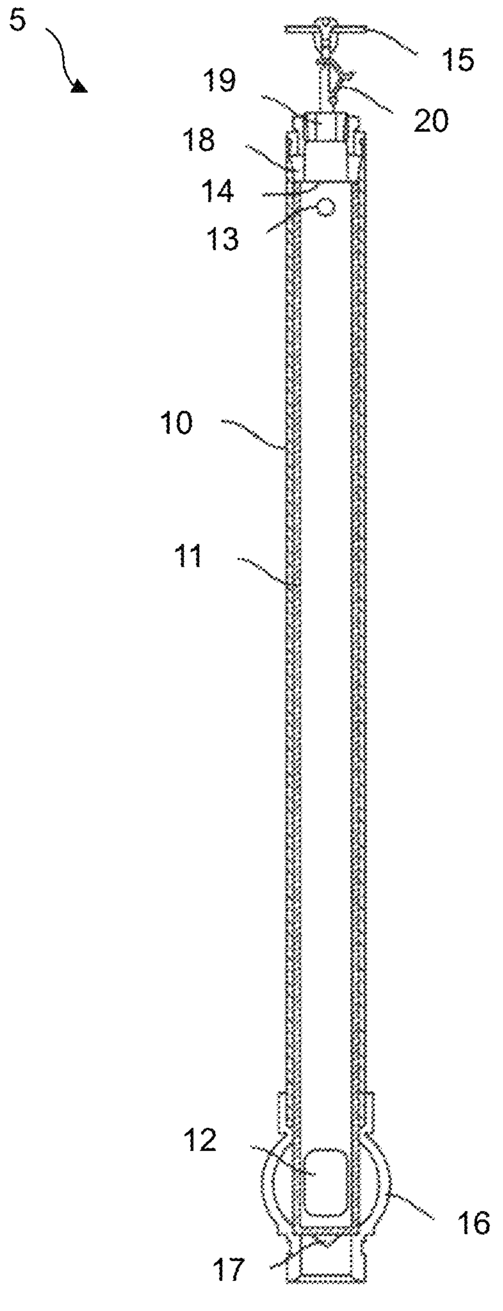
FIGS. 1a and 1b are cross-sectional views of one embodiment of a dry pendent sprinkler.
Figure 1B:
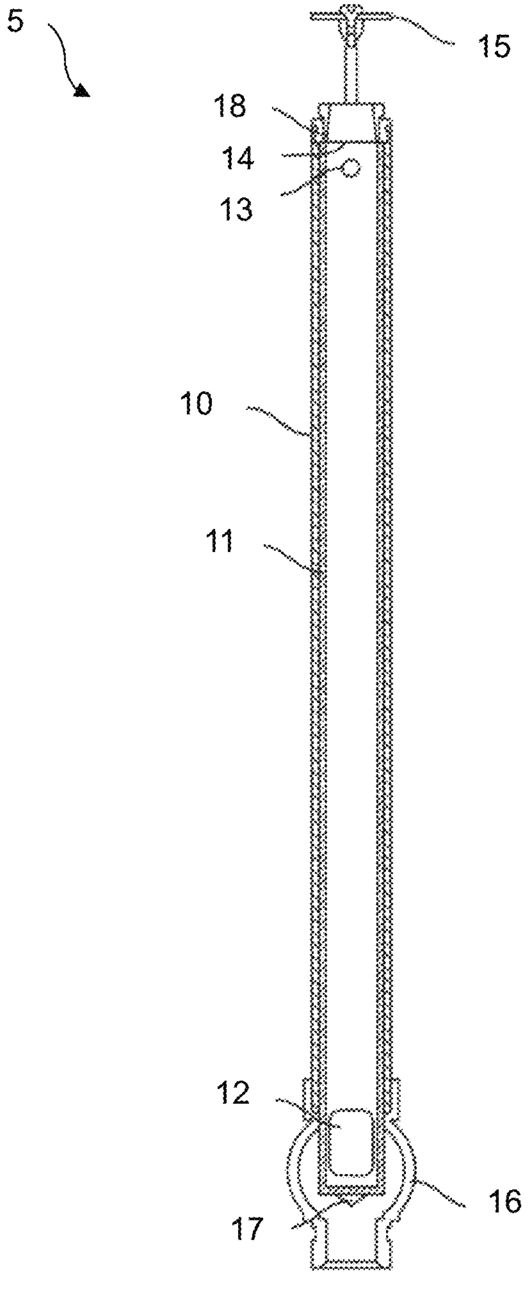

The presently disclosed subject matter is directed to a system for installing and removing a dry pendant sprinkler. Dry pendant sprinklers are frequently used in areas that are exposed to freezing conditions, such as in freezers or unconditioned areas in and around buildings that may experience freezing conditions. The dry pendent sprinkler can extend into an unheated area from a wet pipe system. The sprinklers are fed from a drop where the drop is free of water. A seal is provided at the entrance of the dry sprinkler to prevent water from entering until the sprinkler head activates. FIGS. 1*a* and 1*b* illustrate one example of dry pendent sprinkler 5 in a non-actuated and actuated states, respectively. As shown, the dry sprinkler includes outer casing tube 10 and inner tube 11 positioned within the interior of the outer casing tube. The inner tube includes first opening 12, second opening 13, and third opening 14. Sprinkler deflector 15 is positioned at one end of the pendent. The conventional dry sprinkler also includes inlet fitting 16 for connecting to a supply conduit (not shown), and a sealing washer 17 positioned in a seat in the inlet fitting for creating a seal between the dry sprinkler and the supply conduit when the dry sprinkler is in an unactuated state. In addition, a conventional dry pendent sprinkler typically includes an operating element, including orifice adapter 18, plug 19, and temperature-sensitive element 20.

During actuation of the conventional dry sprinkler, the operating element responds to a high-temperature condition sufficient to fracture the temperature-sensitive element 20, releasing the temperature-sensitive element from the sprinkler, permitting plug 19 to be expelled from the sprinkler and the distal end of the inner tube 11 to move toward the sprinkler deflector 15. Movement of the inner tube towards the sprinkler deflector releases the sealing washer 17 from the seat, allowing the fluid in the supply conduit to pass through the sprinkler for delivery to the space being protected by the sprinkler. The fluid flows primarily into the first opening 12, through the inner tube, and is discharged through the third opening 14 and the orifice adapter 18, striking the sprinkler deflector 15. The sprinkler deflector directs the fluid onto the space protected by the sprinkler in a predetermined pattern. It should be appreciated that the disclosed system is not limited to use with the representative dry pendent sprinkler of FIGS. 1*a* and 1*b*. Rather, the system can be effectively used with any of a wide variety of dry pendent sprinklers.

Figure 2:
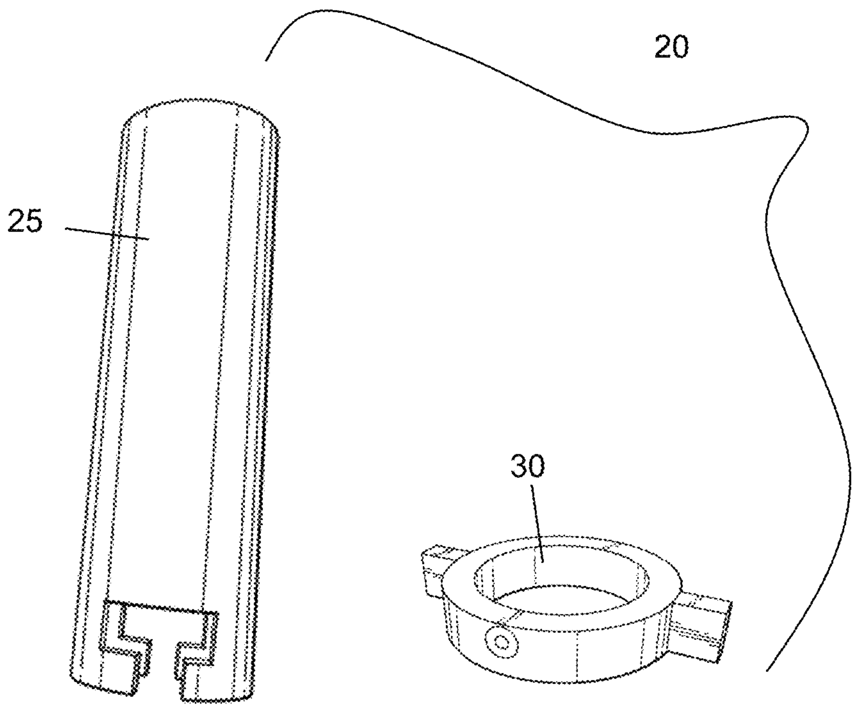
FIG. 2 is a front plan view of a sprinkler installation and removal system comprising a barrel and fitting in accordance with some embodiments of the presently disclosed subject matter.

The disclosed system can be used to effectively install and remove dry sprinkler pendents. As shown in FIG. 2, system 20 includes barrel 25 that cooperates with associated fitting 30 configured about the exterior of the outer casing tube of the sprinkler. As discussed in detail below, the fitting allows for releasable attachment between the sprinkler with the barrel to facilitate installation and removal of the associated sprinkler.

Figure 3A:
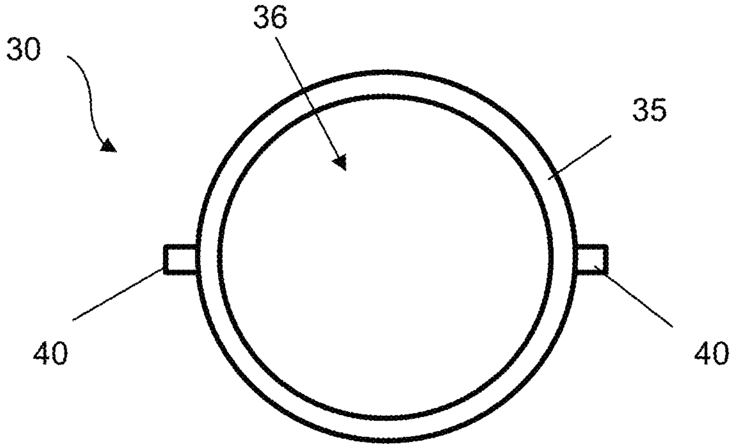
FIG. 3*a* is a top plan view of a system fitting in accordance with some embodiments of the presently disclosed subject matter.

FIG. 3*a* illustrates one embodiment of fitting 30. The term "fitting" broadly refers to any element that mechanically joins two pieces together (e.g., the sprinkler and the barrel). As shown, fitting 30 can include body 35 including interior passageway 36 configured to accommodate a pendent sprinkler. Each fitting also includes one or more teeth 40 coupled to and extending away from the fitting body.

Figure 3B:
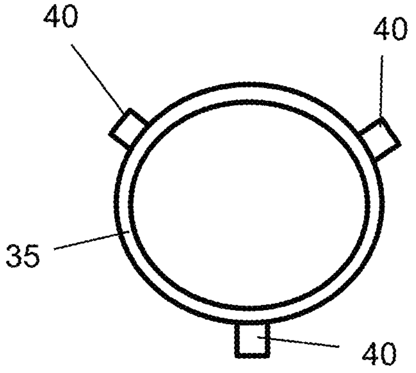
FIGS. 3*b*-3*d* are top plan views of system fittings comprising teeth in accordance with some embodiments of the presently disclosed subject matter.
Figure 3C:
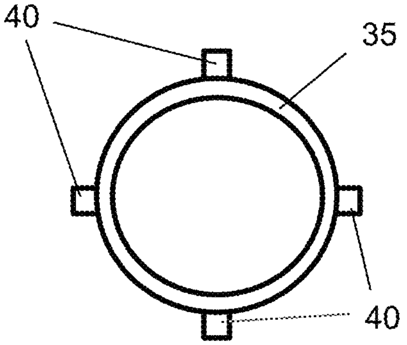
Figure 3D:
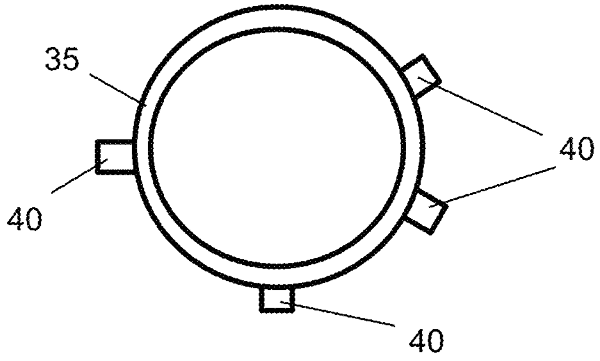

In some embodiments, the fitting can include 1, 2, 3, 4, 5, 6, 7, 8, 9, 10 or more teeth. In some embodiments, the teeth can include pairs that are opposed about 180 degrees as shown in FIG. 3*a* (e.g., evenly spaced about the perimeter of the fitting). However, any arrangement of teeth can be shown, such as the arrangement of FIGS. 3*b* and 3*c* that are equilaterally spaced apart. The presently disclosed subject matter also include groupings of teeth 40 as shown in FIG. 3*d*. Thus, any arrangement of teeth on the fitting is envisioned.

The fitting can have any suitable cross-sectional shape. The fitting cross-sectional shape can be circular or round to correspond with an associated sprinkler head outer casing tube. However, the cross-sectional shape is not limited.

Figure 4A:
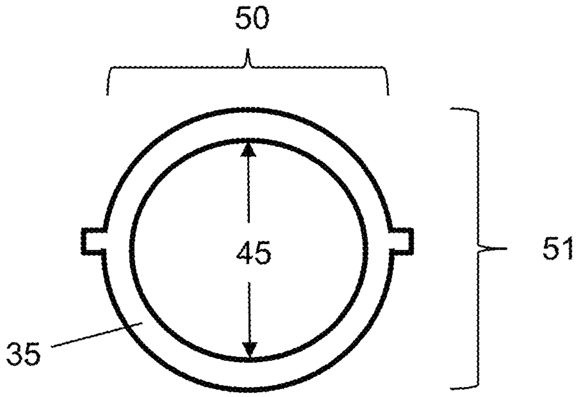
FIGS. 4*a* and 4*b* are top plan views of a system fitting in accordance with some embodiments of the presently disclosed subject matter.
Figure 4B:
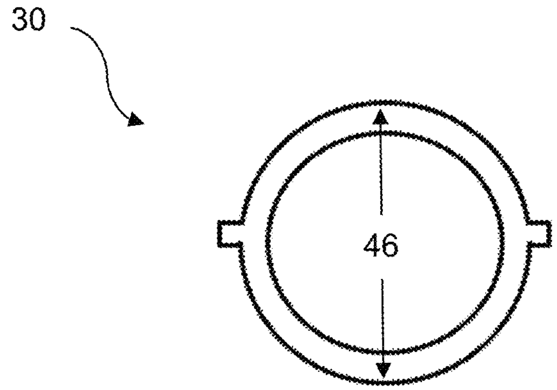

Fitting 30 includes inner diameter 45 and outer diameter 46. The inner diameter corresponds to the longest straight-line distance that passes through a cross-section of the interior center of the fitting, as shown in FIG. 4*a*. The outer diameter corresponds to the longest straight-line distance that passes from one side to an opposed exterior side (excluding the teeth), as shown in FIG. 4*b*.

Figure 4C:
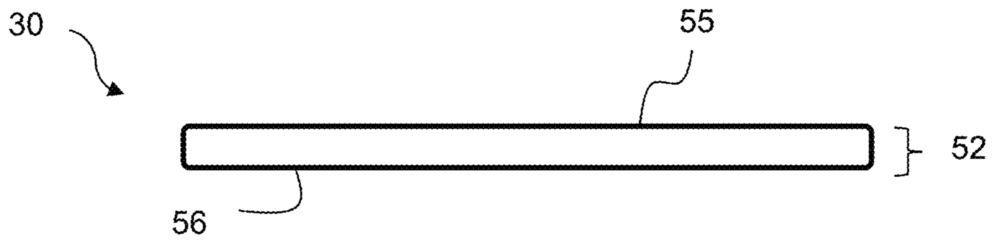
FIG. 4*c* is a side plan view of a system fitting in accordance with some embodiments of the presently disclosed subject matter.

The fitting can be configured in any of a variety of sizes to fit a number of different sized sprinkler pendents. For example, the fitting can include length 50 and/or width 51 of about 1-30 inches or more (e.g., at least/no more than about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, or 30 inches). The term "length" refers to the longest horizontal length of the fitting body. The term "width" refers to the longest vertical length of the fitting body, as shown in FIG. 4*a*. The fitting can also include thickness 52 of about 0.1-5 inches or more (e.g., at least/no more than about 0.1, 0.25, 0.5, 0.75, 1, 1.5, 2, 2.5, 3, 3.5, 4, 4.5, or 5 inches), as shown in FIG. 4*c*. The term "thickness" refers to the distance between fitting top and bottom fitting faces 55, 56. However, it should be appreciated that the fitting can have any suitable dimensions and can be greater or less than the noted ranges for the length, width, and thickness given above.

The fitting teeth can also have any suitable dimensions or shape. For example, teeth 40 can be configured in a square, rectangular, triangular, rounded, etc. shape. Any desired shape can be used.

Figure 5:
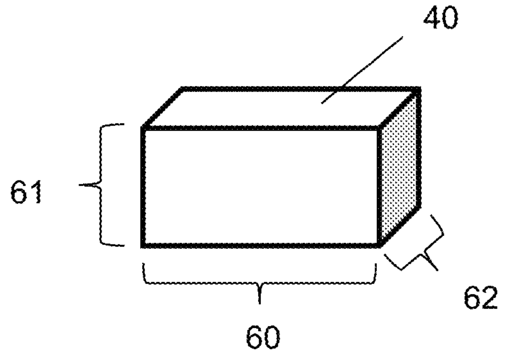
FIG. 5 is a perspective view of a fitting tooth in accordance with some embodiments of the presently disclosed subject matter.

Each tooth can include length, width, and/or thickness 60, 61, 62 (respectively) of about 0.1-3 inches, as shown in FIG. 5. Thus, each tooth can have a length, width, and/or thickness of at least about (or no more than about) 0.1, 0.2, 0.3, 0.4, 0.5, 0.6, 0.7, 0.8, 0.9, 1, 1.5, 2, 2.5, or 3 inches. However, the dimensions of teeth 40 are not limited and can be larger/smaller than the ranges given. The term "tooth" as used herein is not limited and can include any type of projection or outwardly directed member that extends away from the interior passageway of a fitting.

In some embodiments, each tooth is configured in the same or about the same shape, with the same or about the same length, width, and thickness. However, in other embodiments, at least one tooth can differ from at least one other tooth with respect to shape, length, width, and/or thickness. Such an arrangement can provide for increased accuracy when the barrel is attached (e.g., the barrel only fits one way onto the fitting).

Fitting 30 can be constructed from any rigid material, such as (but not limited to) metal (e.g., stainless steel, aluminum), plastic, carbon fiber, or combinations thereof.

Figure 6A:
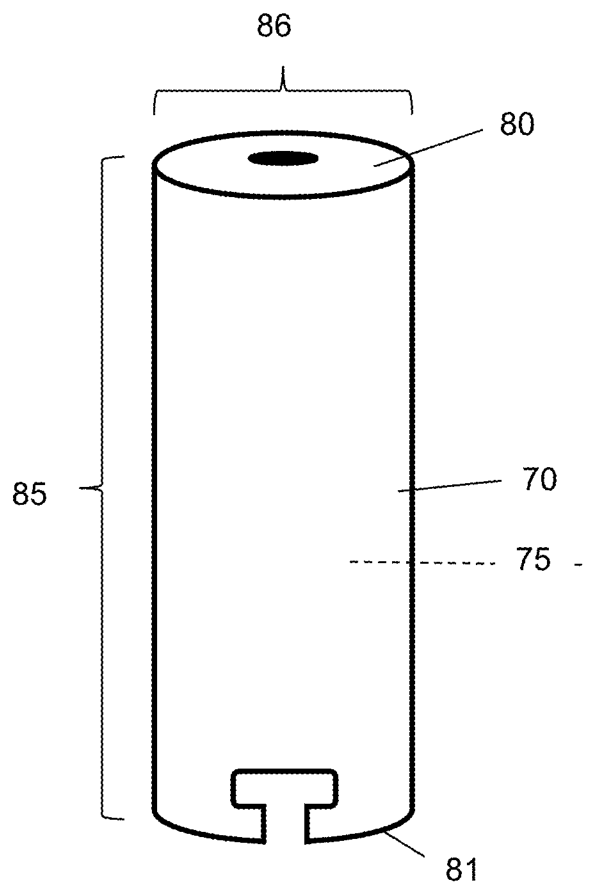
FIG. 6*a* is a perspective view of a system barrel in accordance with some embodiments of the presently disclosed subject matter.

As set forth above, the disclosed system 20 also includes barrel 25 that cooperates with an associated fitting. The term "barrel" refers to an elongated hollow body that may be cylindrically shaped. As shown in FIG. 6*a*, the barrel includes tubular sidewall 70 with hollow interior 75 that is sized to receive the pendent sprinkler. The barrel includes closed first end 80 and opposed open second end 81. Barrel 25 can include length 85 (e.g., the distance between the first and second barrel ends) of about 5-50 inches (e.g., at least/no more than about 5, 6, 7, 8, 9, 10, 11, 12, 15, 20, 25, 30, 35, 40, 45, or 50 inches). The barrel also includes width 86 (the longest distance between two side edges) of about 2-15 inches (e.g., at least/no more than about 2, 3, 4, 5, 6, 7, 8, 9, 10, 11, 12, 13, 14, or 15 inches).

Figure 6B:
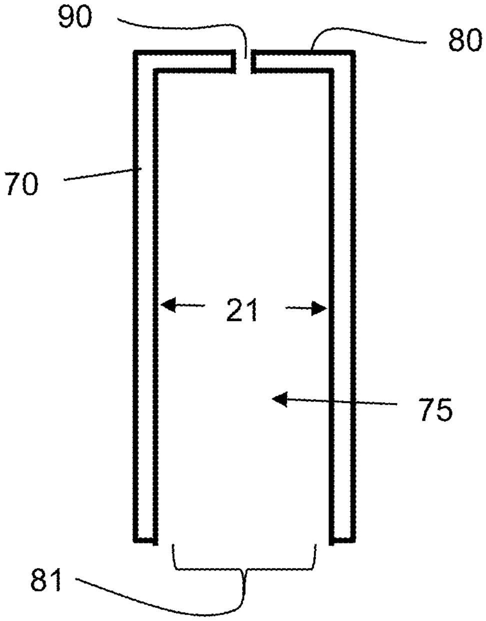
FIG. 6*b* is a cross-sectional view of a system barrel in accordance with some embodiments of the presently disclosed subject matter.

As shown in FIG. 6*b*, the barrel includes inner diameter 21 that is complementary to the outer diameter of a corresponding sprinkler head. Particularly, the inner diameter of the barrel is configured to be slightly larger (e.g., about 0.1, 0.5, 1, 2, 3, 4, 5, 10 percent larger) than the outer diameter of the sprinkler head. In this way, once the fitting is attached to the outer circumference of the sprinkler head, the barrel interior can fit over the sprinkler and interact with teeth 40. Thus, the barrel has an interior diameter that is sized to house the exterior of a pendent sprinkler. The barrel receives at least part of the bottom portion of the sprinkler until the fitting teeth act as a stop. The term "diameter" refers to the length of a straight line segment that passes through the center of the barrel cross-section, spanning from one side to the other.

Figure 6C:
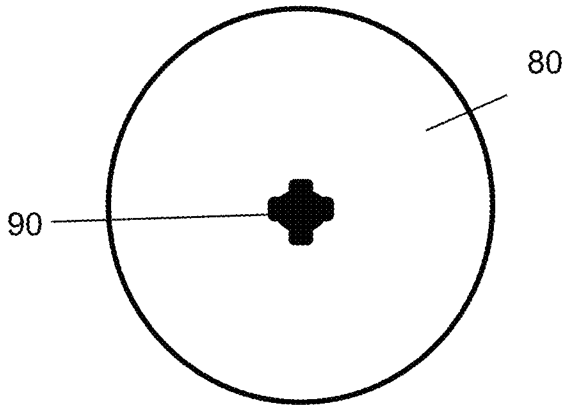
FIG. 6*c* is a top plan view of the first end of a system barrel in accordance with some embodiments of the presently disclosed subject matter.
Figure 6D:
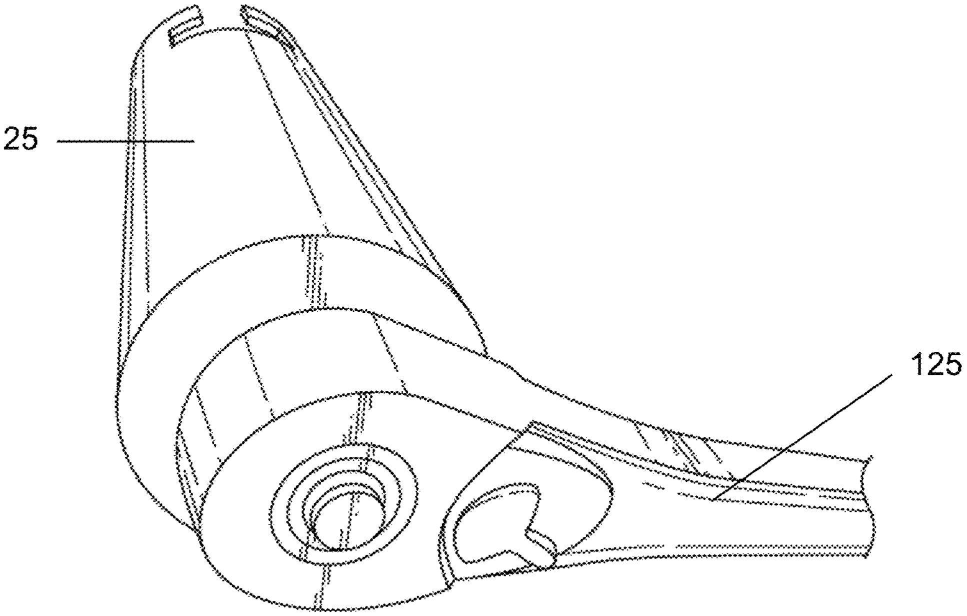
FIG. 6*d* is a perspective view of the first end of a system barrel in accordance with some embodiments of the presently disclosed subject matter.

As shown in FIGS. 6*c* and 6*d*, first end 80 includes aperture 90 that is sized and shaped to cooperate with a wrench or other device that can be used to turn the barrel (e.g., to loosen or tighten a corresponding pendent sprinkler). The term "aperture" refers to any type of opening, such as a hole, gap, slip, or cleft. Aperture 85 can be configured in any size and shape so long as the drive of a socket wrench (or any other suitable tool) can be positioned within the aperture to rotate the barrel (and thereby rotate the pendent sprinkler). The aperture allows for numerous tools to be attached to the first end portion of the barrel to aid in the sprinkler housing removal.

Figure 7A:
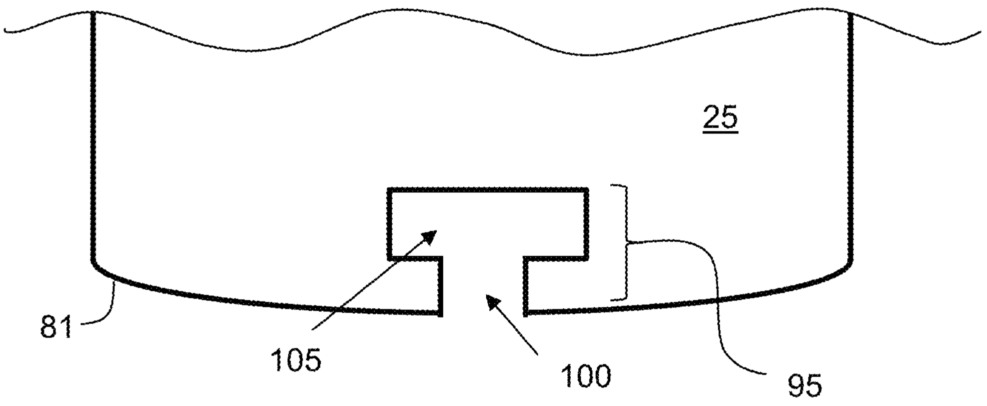
FIG. 7*a* is a fragmentary perspective view of a system barrel second end in accordance with some embodiments of the presently disclosed subject matter.

Barrel 25 also includes one or more slots 95 positioned adjacent to second end 81 that allow the barrel to cooperate with fitting 30. To this end, the number of slots on the barrel corresponds to the number of teeth on the fitting (each tooth is aligned with and cooperates with a corresponding barrel slot). Each slot includes channel 100 (a lengthwise extending slot) positioned in direct contact with the bottom edge of the barrel body, as shown in FIG. 7*a*. Adjacent to each channel is extension 105 (a width-wise extending slot). Thus, the slot can be configured in a "T" shape in some embodiments. Advantageously, the channel allows for a tooth to slide upwards to access the extension, thereby releasably interlocking the fitting and the barrel. Once in the extension, a tooth cannot travel back through the channel to detach from the barrel without rotating the barrel to access the channel. Thus, the channel provides a passageway for a fitting tooth to remain seated into the extension, releasably locking the barrel onto the fitting. Each slot is aligned with a corresponding tooth on the fitting. The slot thereby engages a fitting tooth and allows the barrel to apply torque to the sprinkler when the barrel is rotated.

Barrel 25 can be configured in any cross-sectional shape so long as it allows for cooperation with fitting 30 (and an associated pendent sprinkler). For example, the cross-sectional shape can be circular or round.

Figure 7B:
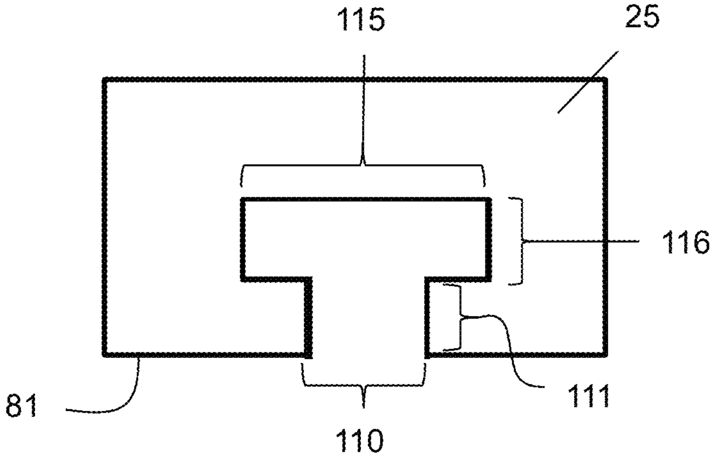
FIG. 7*b* is a front plan view of a barrel second end groove in accordance with some embodiments of the presently disclosed subject matter.

Further, each slot can have any suitable dimensions. As shown in FIG. 7*b*, each slot channel 100 can have length 110 and/or height 111 of about 0.1-3 inches (e.g., at least/no more than about 0.1, 0.2, 0.3, 0.4, 0.5, 0.6, 0.7, 0.8, 0.9, 1, 1.25, 1.5, 1.75, 2, 2.25, 2.5, 2.75, or 3 inches). The extension can also include length 115 of about 0.2-5 inches (e.g., at least/no more than about 0.2, 0.3, 0.4, 0.5, 0.6, 0.7, 0.8, 0.9, 1, 1.5, 2, 2.5, 3, 3.5, 4, 4.5, or 5 inches). The extension can include height 116 of about 0.1-3 inches (e.g., at least/no more than about 0.1, 0.2, 0.3, 0.4, 0.5, 1, 1.5, 2, 2.5, or 3 inches). The slot dimensions are not limited and can be greater or less than the ranges given above. The term "slot" generally refers to any cutout, slit, gap, and/or hole and is not limited in size or shape.

The barrel can be constructed from any suitable material, such as (but not limited to) metal (e.g., steel, stainless steel), wood, plastic, composite material, or combinations thereof.

Figure 8A:
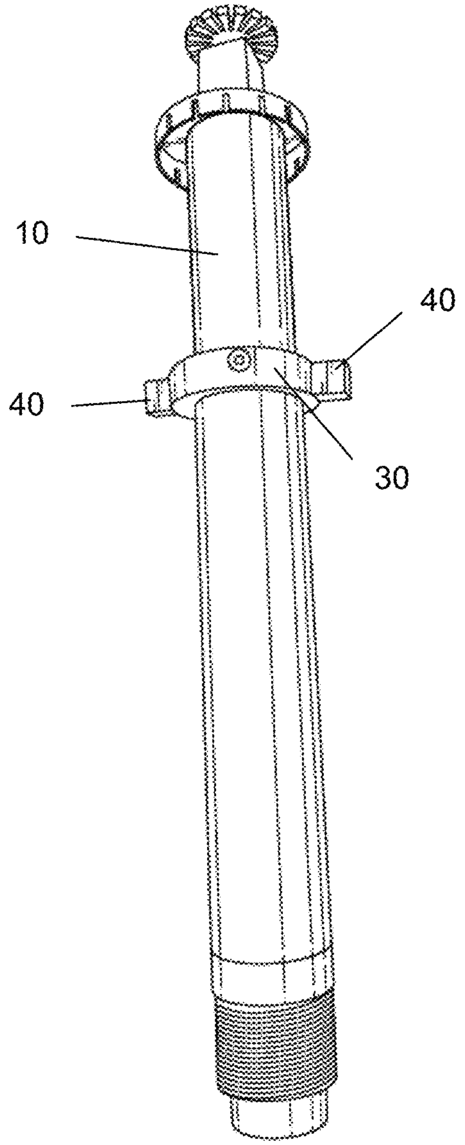
FIGS. 8*a*-8*f* illustrate a method of using the system barrel and fitting in accordance with some embodiments of the presently disclosed subject matter.

In use, when a user desires to install or remove a dry pendent sprinkler, fitting 30 is attached to the outer casing tube 10 of the pendent sprinkler using any suitable method (e.g., screws, bolts, fasteners, magnets, adhesive, welding), as shown in FIG. 8*a*. The fitting can be positioned at any desired location along the casing tube, such as (but not limited to) between upper and lower ends of the exposed portion of the pendent sprinkler. In some embodiments, the fitting can be attached about halfway between the two ends of the sprinkler head casing tube. In other embodiments, the fitting can be positioned more or less than halfway between an end of the sprinkler head relative to the opposed end.

In some embodiments, the length of the dry pendant can be inscribed on the first piece of the sprinkler head escutcheon with Opticz UV. A user can then easily read the escutcheon with a black light to immediately know the proper size barrel/fitting to use. The inscription does not interfere with the aesthetics or function of the sprinkler head.

Figure 8B:
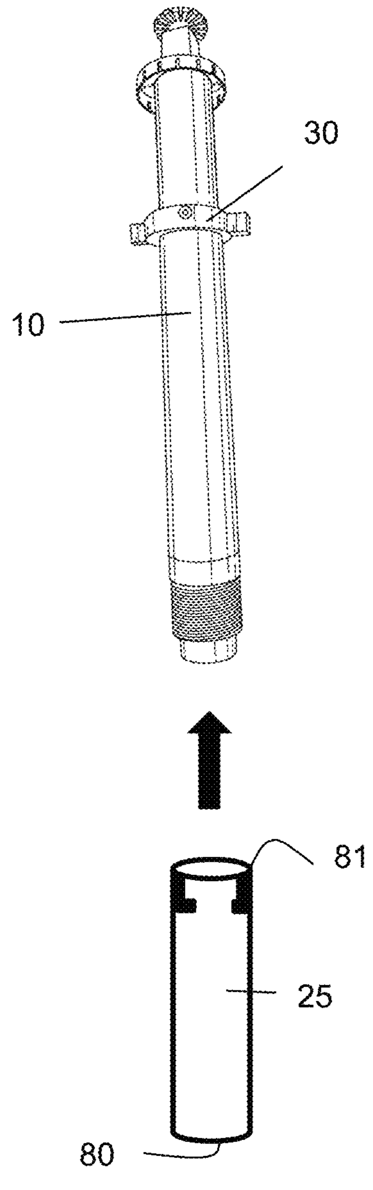
Figure 8C:
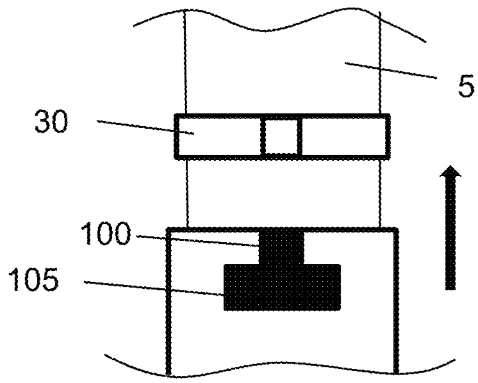
Figure 8D:
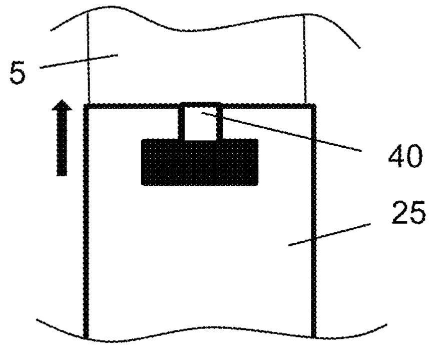
Figure 8E:
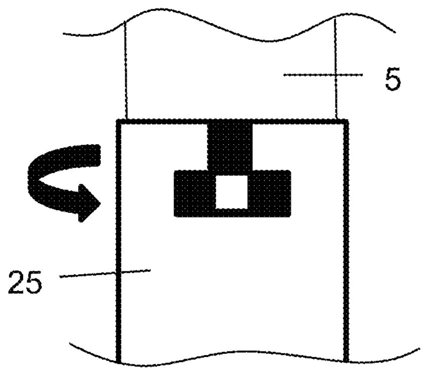
Figure 8F:
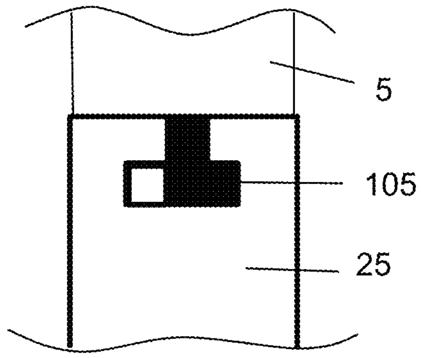

Teeth 40 are exposed on the exterior of the fitting, facing outwards to allow for interaction with the slots of barrel 25. To this end, second end 81 of the barrel is advanced towards the fitting such that the hollow interior of the barrel fits over and houses a portion of the pendent sprinkler. The barrel slots are aligned and adjacent to each tooth, as shown in FIG. 8*b*. Each tooth then travels along a corresponding slot channel and then is rotated left or right to enter extension 105 where the tooth remains locked in place, as shown in FIGS. 8*c*-8*f*. The barrel is then releasably attached to the pendent via fitting 20.

Thus, each tooth acts as a stop, preventing the barrel from extending further over the sprinkler head. Each tooth has a length that is greater than the outer diameter of the barrel, thereby allowing the tooth to travel through the barrel slot and lock the barrel into position over the sprinkler head.

Each tooth further acts as an alignment guide for the barrel, allowing for travel down the channel and into proper position within the extension.

A user can maneuver the barrel (e.g., rotate the barrel in one direction) using aperture 90. For example, drive 120 of socket wrench 125 can be inserted into the aperture. A user can then rotate the handle of the wrench to thereby rotate the barrel (and the associated pendent sprinkler via the fitting). Thus, the barrel rotates in a particular direction (guided by the socket wrench movement), and because the barrel is attached to the pendent via the fitting, the pendant is also rotated. In this way, the pendent can be easily and efficiently installed and removed.

Figure 9:
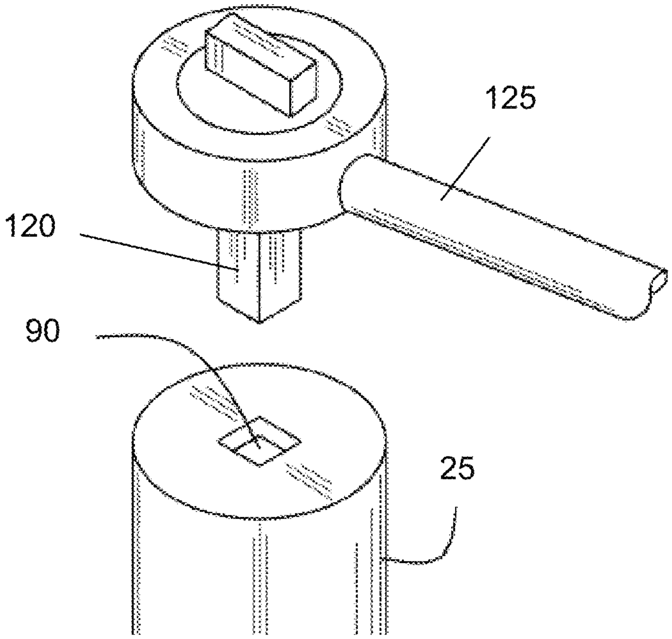
FIG. 9 is a perspective view of positioning a wrench in an aperture of the first barrel end in accordance with some embodiments of the presently disclosed subject matter.

Alternatively, the rotating can be done by hand or with a tool, such as a channel lock, a custom tool, or with an open top where a user can place a handle type device in the aperture. The handle can also be permanently part of the tool, such as a t-handle as shown in FIG. 9.

The steps can then be reversed to decouple the barrel from the fitting. For example, each tooth can be rotated to travel from the extension through the slot channel. In this way, the fitting is uncoupled and separated from the barrel. The fitting can optionally be removed from the pendent sprinkler and reused later.

The presently disclosed subject matter includes many benefits over current systems. For example, the disclosed system allows for the quick and easy installation and removal of a dry sprinkler pendent.

The system is efficient, requiring only a single user instead of multiple users.

The disclosed device does not require additional tools as are typically needed for traditional installation and removal of sprinkler heads.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A pendent sprinkler installation and removal system comprising:
- a fitting defined by an interior passageway with an inner diameter that is complementary to the outer diameter of a pendent sprinkler, and one or more teeth that extend outwardly from an outer edge of the fitting;
- a barrel comprising:
  - a closed first end defined by an aperture;
  - an open opposed second end; and
  - a sidewall positioned between the first and second ends, the sidewall comprising at least one slot adjacent to the open second end, the slot comprising a channel adjacent to the first end and an extension positioned in communication with the channel;
- wherein each tooth is configured for releasable insertion into the channel and extension of a corresponding slot.

2. The system of claim 1, wherein the pendent sprinkler is a dry pendent sprinkler.

3. The system of claim 1, wherein the aperture is configured for inserting a drive of a socket wrench positioning a user for selectively turning the socket wrench for removing and installing the sprinkler head.

4. The system of claim 1, comprising 1-10 teeth.

5. The system of claim 1, wherein the teeth are evenly spaced about a perimeter of the fitting.

6. The system of claim 1, wherein the fitting has a length, width, or both of about 0.5-30 inches.

7. The system of claim 1, wherein each tooth has a length, width, and thickness of about 0.1-3 inches.

8. The system of claim 1, wherein the barrel comprises a length of about 5-50 inches and a width of about 2-15 inches.

9. The system of claim 1, wherein the barrel slot is configured in a T shape.

10. The system of claim 1, wherein the barrel slot channel has a length and height of about 0.1-3 inches.

11. The system of claim 1, wherein the barrel slot extension has a length of about 0.2-5 inches and a height of about 0.1-5 inches.

12. A method of installing or removing a pendent sprinkler, the method comprising:

positioning the fitting of the system of claim 1 about the exterior of a pendent sprinkler;

inserting the open second end of the barrel over a portion the pendent sprinkler such that each fitting tooth travels along the slot channel;

rotating the barrel such that each tooth is positioned with a corresponding slot extension, thereby releasably joining the barrel to the fitting;

inserting a tool into the aperture of the first end of the barrel to rotate the barrel, thereby installing or removing the pendent sprinkler.

13. The method of claim 12, wherein the pendent sprinkler is a dry pendent sprinkler.

14. The method of claim 12, wherein a socket wrench drive is inserted into the aperture of the first end of the barrel to rotate the barrel.

15. The method of claim 12, wherein the fitting comprises 1-10 teeth.

16. The method of claim 12, wherein the teeth are evenly spaced about a perimeter of the fitting.

17. The method of claim 12, wherein the barrel comprises a length of about 5-50 inches and a width of about 2-15 inches.

18. The method of claim 12, wherein the barrel slot is configured in a T shape.

19. The method of claim 12, wherein the barrel slot channel has a length and height of about 0.1-5 inches.

20. The method of claim 12, wherein the barrel slot extension has a length of about 0.2-5 inches and a height of about 0.1-5 inches.

* * * * *